US008522201B2

(12) United States Patent
Elmieh et al.

(10) Patent No.: US 8,522,201 B2
(45) Date of Patent: Aug. 27, 2013

(54) METHODS AND APPARATUS FOR SUB-ASSET MODIFICATION

(75) Inventors: Baback Elmieh, San Diego, CA (US); Rachid El Guerrab, San Diego, CA (US); Andi Terrence Smithers, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 12/942,580

(22) Filed: Nov. 9, 2010

(65) Prior Publication Data

US 2012/0117536 A1    May 10, 2012

(51) Int. Cl.
G06F 9/44      (2006.01)
G06F 7/00      (2006.01)
G06F 17/00     (2006.01)
G06F 15/16     (2006.01)
G06F 3/048     (2006.01)
H04L 9/32      (2006.01)

(52) U.S. Cl.
USPC ............... 717/110; 707/999.01; 707/999.101; 707/999.102; 707/999.2; 707/698; 707/690; 709/206; 709/246; 715/222; 715/235; 715/781; 717/100; 717/108; 713/170

(58) Field of Classification Search
None
See application file for complete search history.

(56) References Cited

U.S. PATENT DOCUMENTS

| 5,680,619 | A  | * | 10/1997 | Gudmundson et al. | ........ 717/108 |
| 5,907,704 | A  | * | 5/1999  | Gudmundson et al. | ........ 717/100 |
| 6,510,468 | B1 | * | 1/2003  | Hayne             | ........... 709/246 |
| 8,176,018 | B1 | * | 5/2012  | Bisson et al.     | ................ 707/690 |
| 2002/0147849 | A1 |   | 10/2002 | Wong et al.       |                 |
| 2002/0170068 | A1 | * | 11/2002 | Rafey et al.      | .................... 725/112 |
| 2006/0010153 | A1 | * | 1/2006  | Bugaj             | ........... 707/102 |
| 2006/0179033 | A1 |   | 8/2006  | Stanke et al.     |                 |
| 2008/0005659 | A1 | * | 1/2008  | Fujimaki          | ........... 715/511 |
| 2008/0049015 | A1 |   | 2/2008  | Elmieh et al.     |                 |
| 2008/0077617 | A1 |   | 3/2008  | Schulz et al.     |                 |
| 2008/0091945 | A1 | * | 4/2008  | Princen et al.    | ................ 713/170 |
| 2008/0195626 | A1 | * | 8/2008  | Ukigawa et al.    | ................ 707/10 |
| 2008/0281872 | A1 | * | 11/2008 | Mizuno            | ........... 707/200 |
| 2008/0320412 | A1 | * | 12/2008 | Wake              | ........... 715/781 |
| 2009/0083617 | A1 | * | 3/2009  | Hironiwa          | ........... 715/222 |
| 2009/0198714 | A1 | * | 8/2009  | Wake              | ........... 707/101 |
| 2009/0307625 | A1 | * | 12/2009 | Daniels           | ........... 715/769 |
| 2010/0077295 | A1 | * | 3/2010  | Ichino            | ........... 715/235 |
| 2010/0146060 | A1 | * | 6/2010  | Graham            | ........... 709/206 |
| 2010/0257149 | A1 | * | 10/2010 | Cognigni et al.   | ............. 707/698 |

OTHER PUBLICATIONS

Arnold W.M. Smeulders et al., Content-Based Image Retrieval at the End of the Early Years, IEEE 2000, [Retrieved on Jan. 11, 2013]. Retrieved from the internet: <URL: http://ieeexplore.ieee.org/stamp/stamp.jsp?tp=&arnumber=895972> 32 Pages (1349-1380).*
International Search Report and Written Opinion—PCT/US2011/052298—ISA/EPO—Jan. 15, 2013.

* cited by examiner

*Primary Examiner* — Don Wong
*Assistant Examiner* — Anibal Rivera
(74) *Attorney, Agent, or Firm* — Nicholas A. Cole

(57) ABSTRACT

Methods and apparatus for on-the-fly identification of sub-asset modifications in a data pipeline are described.

56 Claims, 16 Drawing Sheets

METHODS AND APPARATUS FOR SUB-ASSET MODIFICATION

BACKGROUND

Traditionally, importing complex assets into an authoring framework poses several challenges for iterative workflows. The artists and programmers utilizing the authoring environment may be required to use source files that are created in various other applications. In addition, workflows may be split between teams, and files may be shared via software configuration management (SCM) systems which are implemented to update underlying files that are used in a project. A problem with such authoring environments is the need to directly manage the underlying files from various sources in order to realize when changes occur from source tools.

Conventional authoring environments also specify a "unit of change" on their users at the file level. Users are asked to analyze the files they are building, to identify logical units, and to manually split these logical units across files. The files are then distributed amongst the team with the intent is that, as each file is changed, it corresponds to a logical unit. This convention scheme quickly breaks down in practice, since iterative workflows often deprecate initial assumptions about logical units.

Accordingly, what is needed is an authoring environment that detects where users have changed their files and localizes updates only to those components without imposing any workflow changes on users.

SUMMARY

This disclosure relates generally to methods and apparatus for identification of sub-asset modifications in a graphics authoring system.

In one aspect, this disclosure relates to a computer-implemented method for processing scene-related information in an editing environment. The method may include receiving a source asset containing scene information defining at least a portion of a scene, and generating a first canonical representation corresponding to the source asset. The method may also include receiving an updated version of the source asset that contains updated scene information, and generating an updated canonical representation corresponding to the updated version of the source asset. The method may further include comparing the first canonical representation and the updated canonical representation, and detecting that the source asset has been updated based on the comparison.

According to another aspect, an apparatus is also disclosed. The apparatus may include a memory containing exported assets defining a user interface, the exported assets being generated within an iterative development environment in which components of representations of source assets stored within the memory are selectively updated in response to changes to the source assets affected external to the development environment. The apparatus may further include a graphics engine in an embedded device, the graphics engine being configured to render the user interface based upon the exported assets.

Additional aspects are further described below in conjunction with the appended drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

In various aspects, the techniques and apparatus described herein may be used for development, editing and/or generating output for computer graphics applications, including 3D computer graphics applications configured for execution on mobile devices. These mobile devices may be cellular phones, PDAs or other devices disposed for use in wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks as well as other communications networks.

Editing of content and applications for provision on mobile devices is typically done in an authoring environment, also described herein as an authoring framework. The authoring environment generally includes computer hardware component such as servers, monitors, I/O devices, network connection devices, as well as other associated hardware for facilitating editing of digital content. In addition, the authoring environment includes one or more application programs configured to receive, convert, process, store, retrieve, transfer and/or export assets, data and other content and information.

A typical authoring environment may be configured for importation of source assets of various types. As used herein, assets refer to information and data that may be stored in various objects, file structures and formats, assets that may include multiple files. In general, an asset represents content, such as graphics and other content to be rendered as part of a scene or display on a device, and may include images, video, audio, data, metadata and other information. Assets may include complex configurations of sub-assets, also denoted herein as elements, and may be provided from different digital content creation (DCC) applications, such as Adobe vector, image and/or video application programs, Maya, Futurewave, and/or other image, video, text and/or audio content generation programs.

Figure 1:
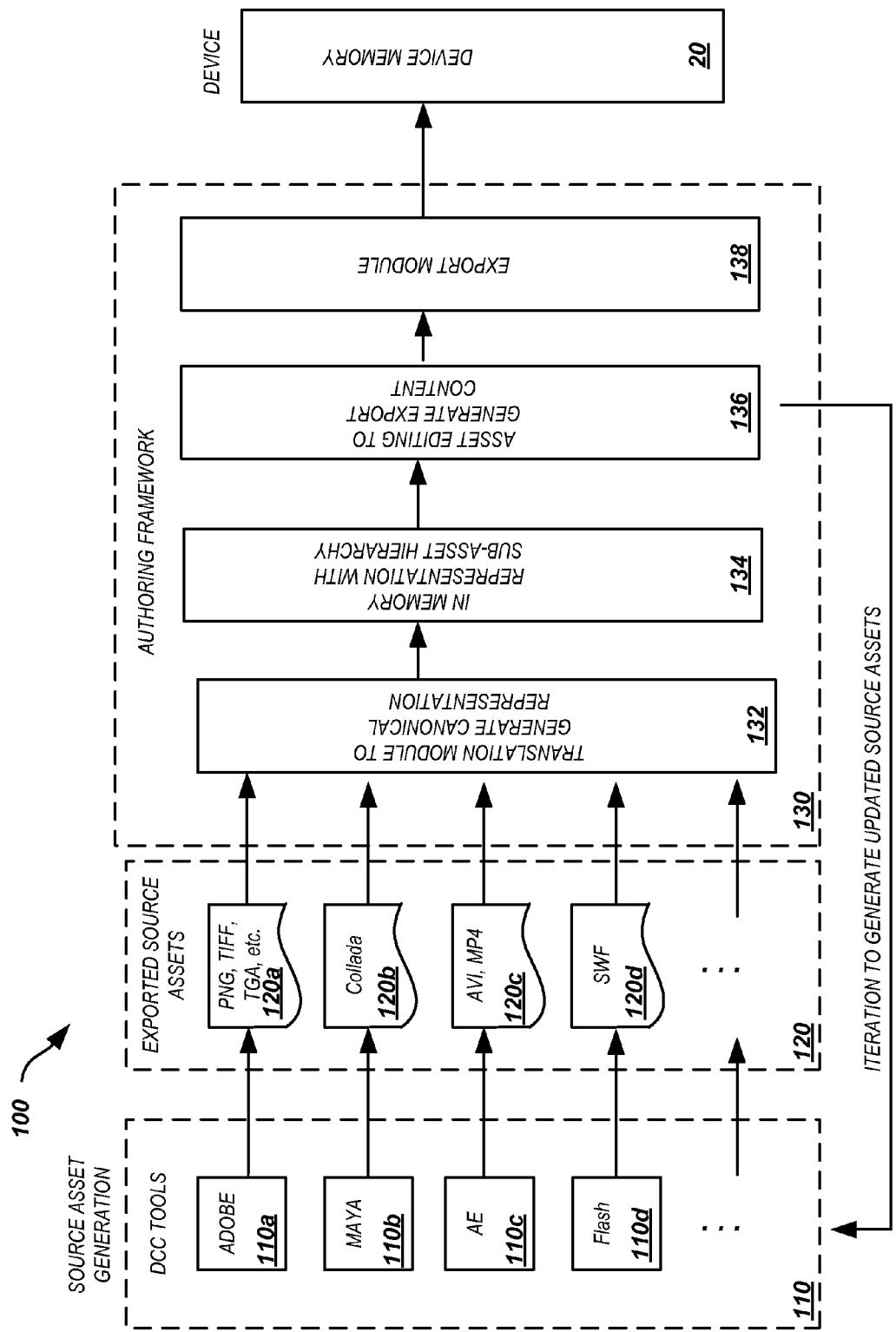
FIG. 1 illustrates an example authoring workflow.

FIG. 1 illustrates a system 100 that illustrates one example of import and processing of assets in an authoring environment. As shown in FIG. 1, one or more asset generation tools 110, such as Adobe applications 110a and 110c (e.g., Adobe's Photoshop software for creating and editing images, Adobe's After Effects application for creating and editing of videos), a Maya application 110b (e.g., Autodesk's Maya application for creating and editing of 3D models and associated animation), a Flash application 110c and/or other content generation applications (Premiere, Vegas, Final Cut and others not shown) may be used to generate source assets, which are then exported in their corresponding file formats 120a-120d. The assets may then be received at the authoring framework 130, and, as further described below, the assets may then be translated at module 132 into a canonical form representation, which may include a hierarchical tree representation of various sub-assets of the converted source assets, and stored in memory in module 134. One or more editing applications 136 in the authoring framework may then be used by content editors to generate output content for provision on a device. An export module 138 may be used to convert the edited content, which may be represented as a project in the authoring framework, into an appropriate output format for provision to an external system and/or directly to the device 20.

As shown in FIG. 1, in a representative authoring workflow, assets may be generated by multiple DCC tools and then iteratively modified (i.e., one or more assets or sub-assets may be edited in the DCC application and re-submitted to the authoring framework in response to editing the composite project in the authoring framework). However, importing complex assets into an authoring framework poses several challenges for iterative art workflows. The key to interactive workflows is the ability to quickly see changes from source tools in the composition environment.

In an exemplary implementation, an intermediate canonical representation of received assets may be generated, with this form computed on demand as new assets are imported into the authoring environment.

In addition, the canonical form may employ a hierarchical hashing and lookup structure to provide fast indexing into the scene. Then, when a complex asset is modified outside the authoring framework, the framework compares the internal representation of the scene with the canonical form of the updated asset, and once the changed regions are identified, only the changed regions within the authoring environment may be updated. This approach ensures that any time spent updating internal representation of assets is only spent on areas of the scene that were updated by the artist or editor, with no need to reload the entire scene. This approach may be advantageous for editing content for provision on mobile devices such as cellular phones, PDAs and other mobile devices.

Figure 2A:
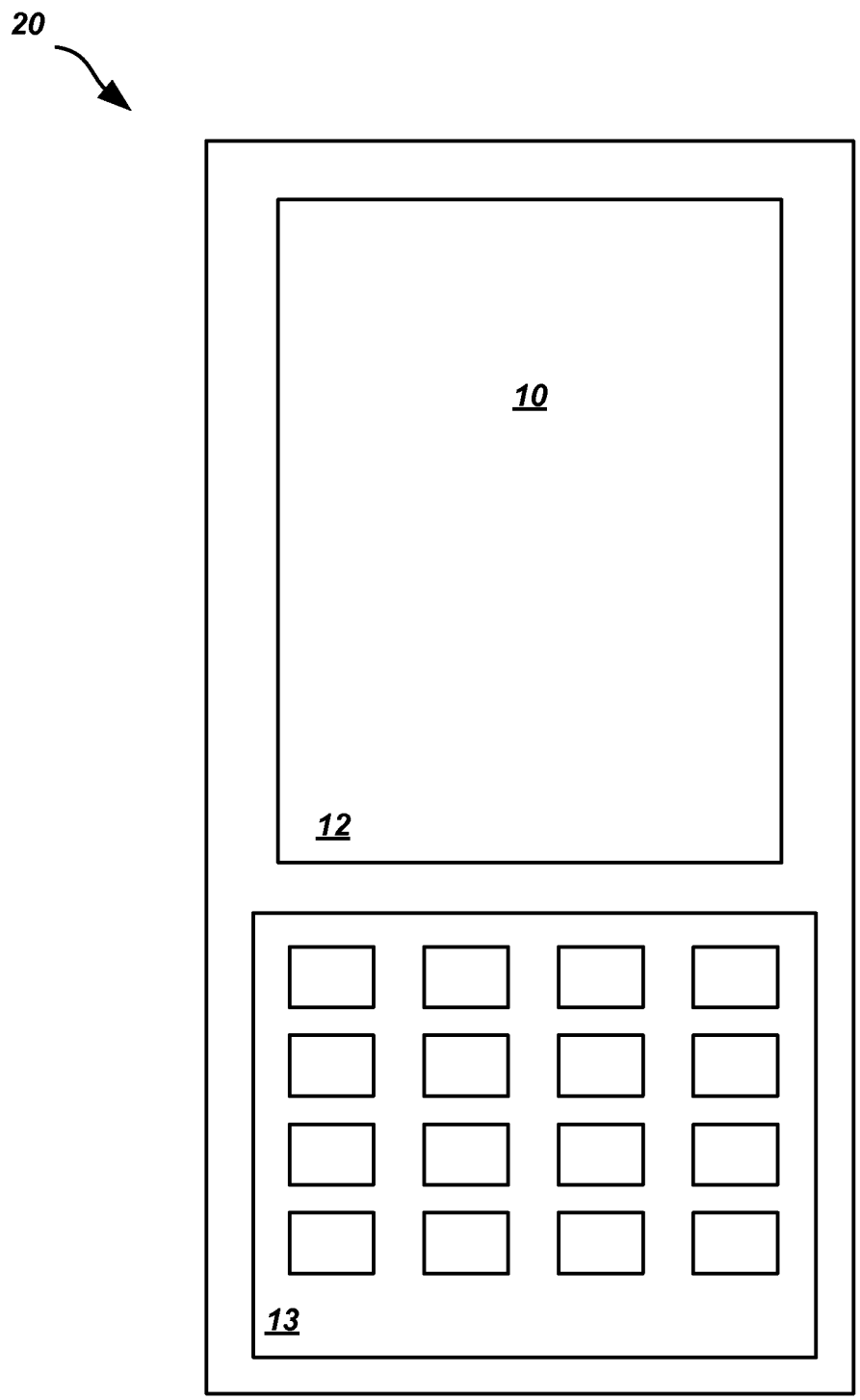
FIG. 2A illustrates a mobile device.

Attention is now directed to FIG. 2A which illustrates a high level diagram of an example mobile device for which content may be generated on an authoring system such as shown in FIG. 1. Contemporary mobile devices such as shown in FIG. 2A typically include dedicated hardware and software for providing graphics displays. These often include graphics engines including graphics processors to accelerate display performance. Graphics processors and engines are widely used to render 2-dimensional (2-D) and 3-dimensional (3-D) images for presentation on electronic displays, such as on mobile cellular devices or other mobile devices. A graphics processor is a dedicated processor optimized for accelerating graphics. The processor is typically designed specifically to perform floating-point calculations, which are fundamental to 3D graphics rendering. A graphics engine may include a processor coupled with other components such as a frame buffer or other video display circuitry, for performing graphics calculations independently of a computer's main processor. In some device implementations, the graphics engine components may be incorporated with the main processor and/or other processors. Graphics processors may be characterized by the number of pipelines (vertex and fragment shaders), which translate a 3D image characterized by vectors, such as vertices and lines, into a 2D image formed by pixels.

For example, a 3-D image may be modeled with surfaces, and each surface may be approximated with triangles. The number of triangles needed to represent the 3-D image is dependent on the complexity of the surfaces and the desired resolution for the image. The total number of triangles for the 3-D image may be quite large, e.g., in the millions. A typical graphics processor attempts to render the triangles for 3-D images as quickly as possible. Each triangle may be defined by (x, y) coordinates for the three vertices of the triangle. Each vertex of each triangle is associated with various attributes such as color, texture, depth, and so on. The graphics processor may render each triangle by interpolating each of the attributes for that triangle. For each attribute of each triangle, the graphics processor may determine a proper value for that attribute at each pixel location within the triangle. The graphics processor typically achieves this by performing linear interpolation using the values given for the attribute at the three vertices of the triangle. Since a 3-D image may include many triangles and since each triangle may have many attributes, the rendering process is typically very computationally intensive. Moreover, as hardware technology continues to accelerate, new graphics engine are periodically introduced having improved performance capabilities. By way of example, mobile device 20 may be a cellular phone, PDA or other mobile or wireless device. Mobile device 20 typically includes keypads or other user I/O interfaces 13 as well as a display 12, configured to render a scene 10. Scene 10 may be a two dimensional representation of a 3D scene, where elements of the 3D scene are rendered on a flat, two dimension display such as an LCD panel. The various scene elements may be represented in the authoring environment as source assets imported from a DCC program as shown in FIG. 1.

Figure 2B:
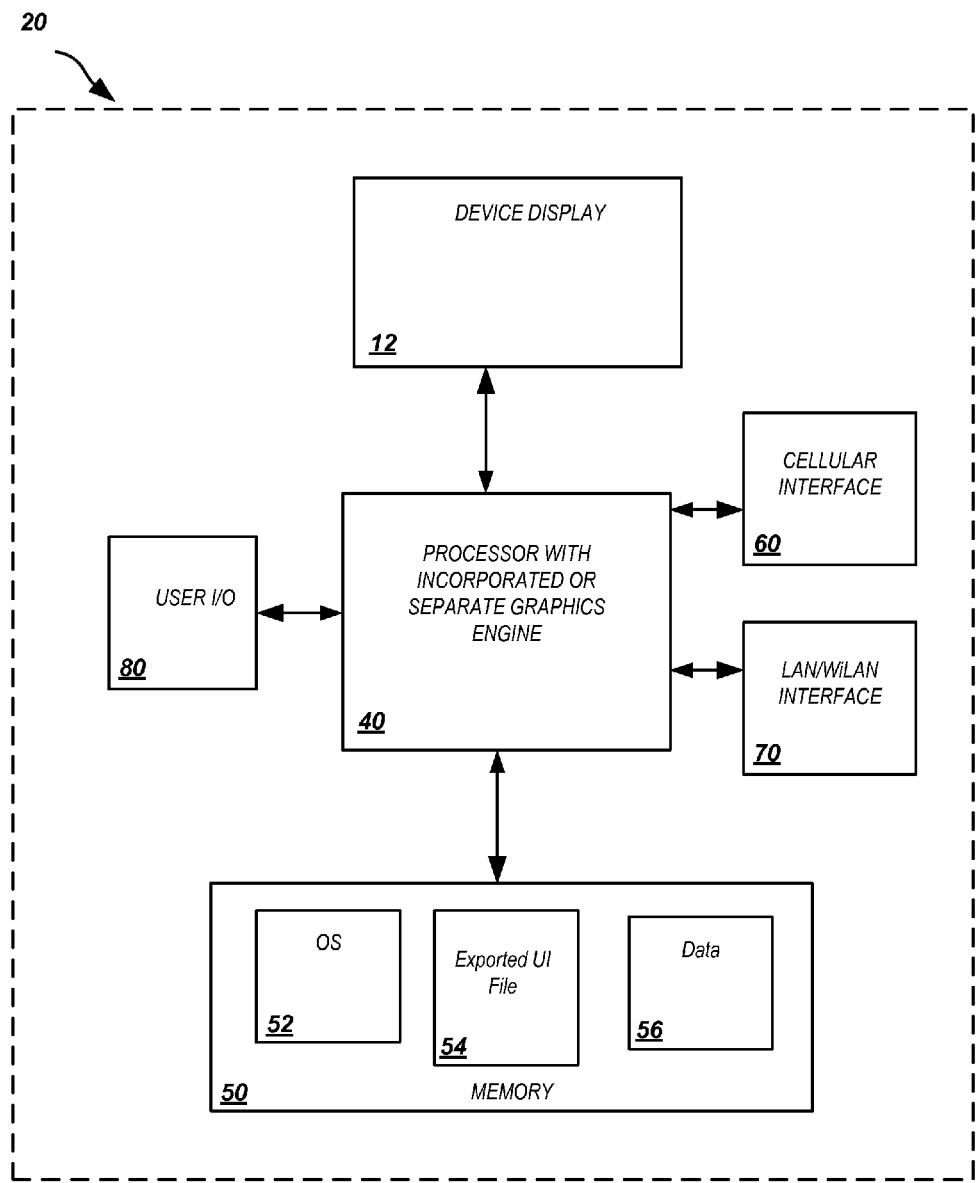
FIG. 2B illustrates additional details of the mobile device of FIG. 2A.

FIG. 2B illustrates additional details of mobile device 20. In particular, mobile device 20 may include one or more processors 40. Processor 40 may be a graphics processor or may be a multi-purpose processor incorporating graphics processor functionality. Processor 40 is coupled to a memory space 50, which may comprise SRAM, DRAM, Flash and/or other physical memory devices. Memory space 50 may be configured to store an operating system (OS) 52, one or more application programs, such as a UI program 52, data 56 associated with the mobile device, applications running on processors in the device, user information, or other data or content. Mobile device 20 may further include one or more User I/O interfaces 80, such as keypads, touch screen inputs, mice, Bluetooth devices or other I/O devices. In addition, mobile device 20 may include a cellular or other over the air wireless carrier interface 60 as well as a network interface 70, that may be configured to communicate via a LAN or wireless LAN (WiLAN), such as a Wi-Fi network. Other interfaces, such as USB or other wired interfaces (not shown) may also be included.

Application programs, such as UI program 54, may be generated on the authoring framework as shown in FIG. 1, and imported or loaded onto the mobile device 20 from the cellular interface 60, network interface 70 or other interfaces.

Figure 3A:
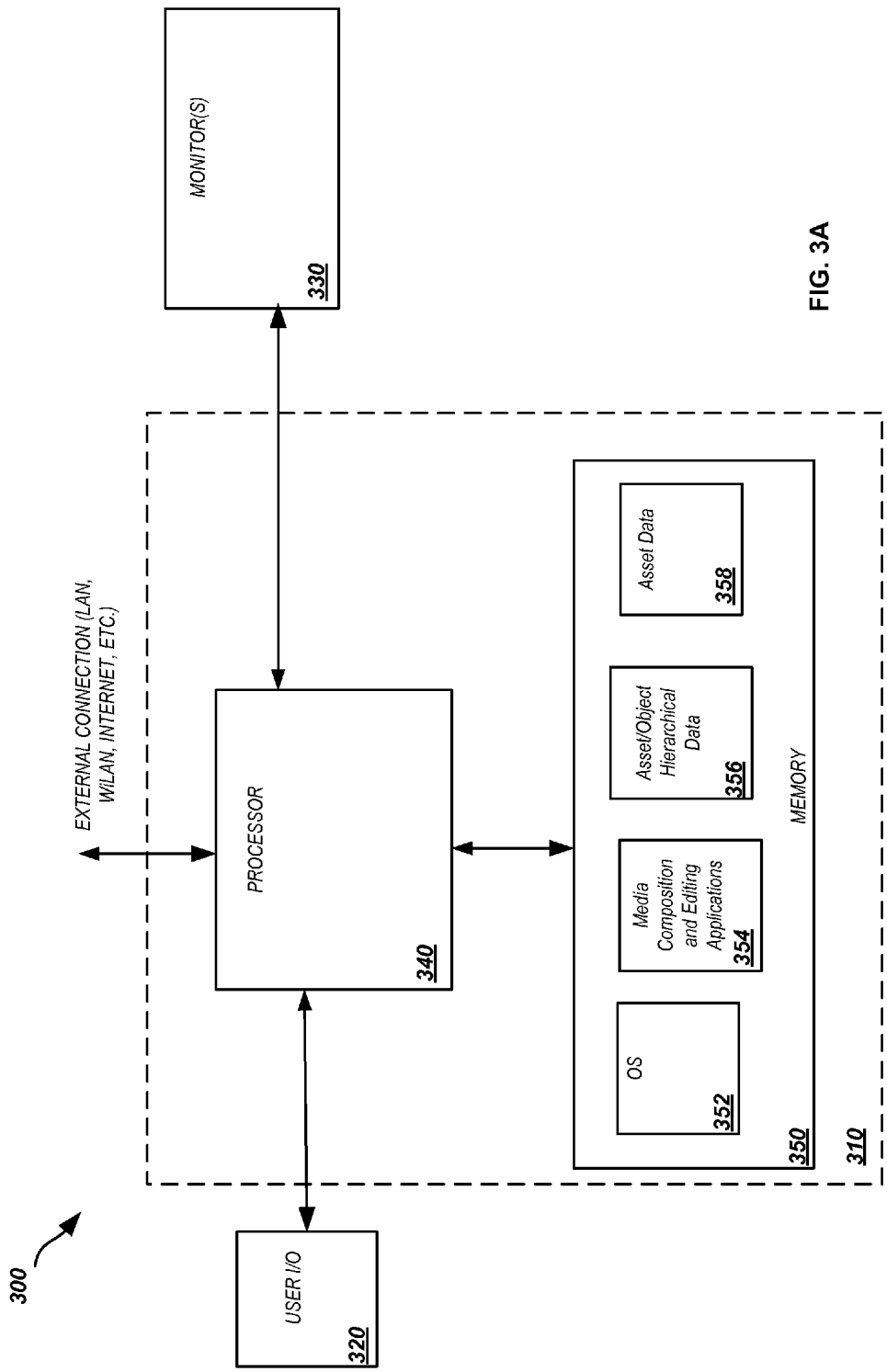
FIG. 3A illustrates details of an example authoring framework on which applications for the mobile device of FIG. 2A may be edited.

As noted previously, applications and content for execution on mobile device 20 may be developed by one or more authors using a system such as system 100, which includes an authoring framework 130. A high level diagram of an example implementation of an authoring framework 300, which may correspond to framework 132 of FIG. 1, is shown in FIG. 3A. Framework 300 may include one or more computer servers or other processor elements 310, as well as one or more monitors 330, one or more user I/O devices, such as keyboards, mice, tablets or other input devices. Framework 300 includes a memory space 350, typically incorporated in server 310. Memory space 350 may include one or more physical memory devices, such as DRAM, SRAM, flash, hard disk drives, or other storage devices. Memory space 350 may be configured to store one or more operating systems (OS) 352, one or more authoring, composition and/or editing applications 354, as well as received asset data 358, which may represent corresponding asset objects or other data structures, one or more sets of asset hierarchical data 356, which may be configured to define a hierarchical tree structure associated with a particular asset, as well as other data or information (not shown). In an exemplary embodiment, the hierarchical structure is typically based on the corresponding structure of a particular type of complex asset and relationships between sub-assets or elements. For example, a 3D object file may contain sub-assets arranged in a particular relationship based on the asset's structural definition. Likewise, graphics files such as Flash include sub-assets related to each other based on a hierarchical definition. Other file types may similarly have a structure defining hierarchical relationships between sub-assets.

Figure 3B:
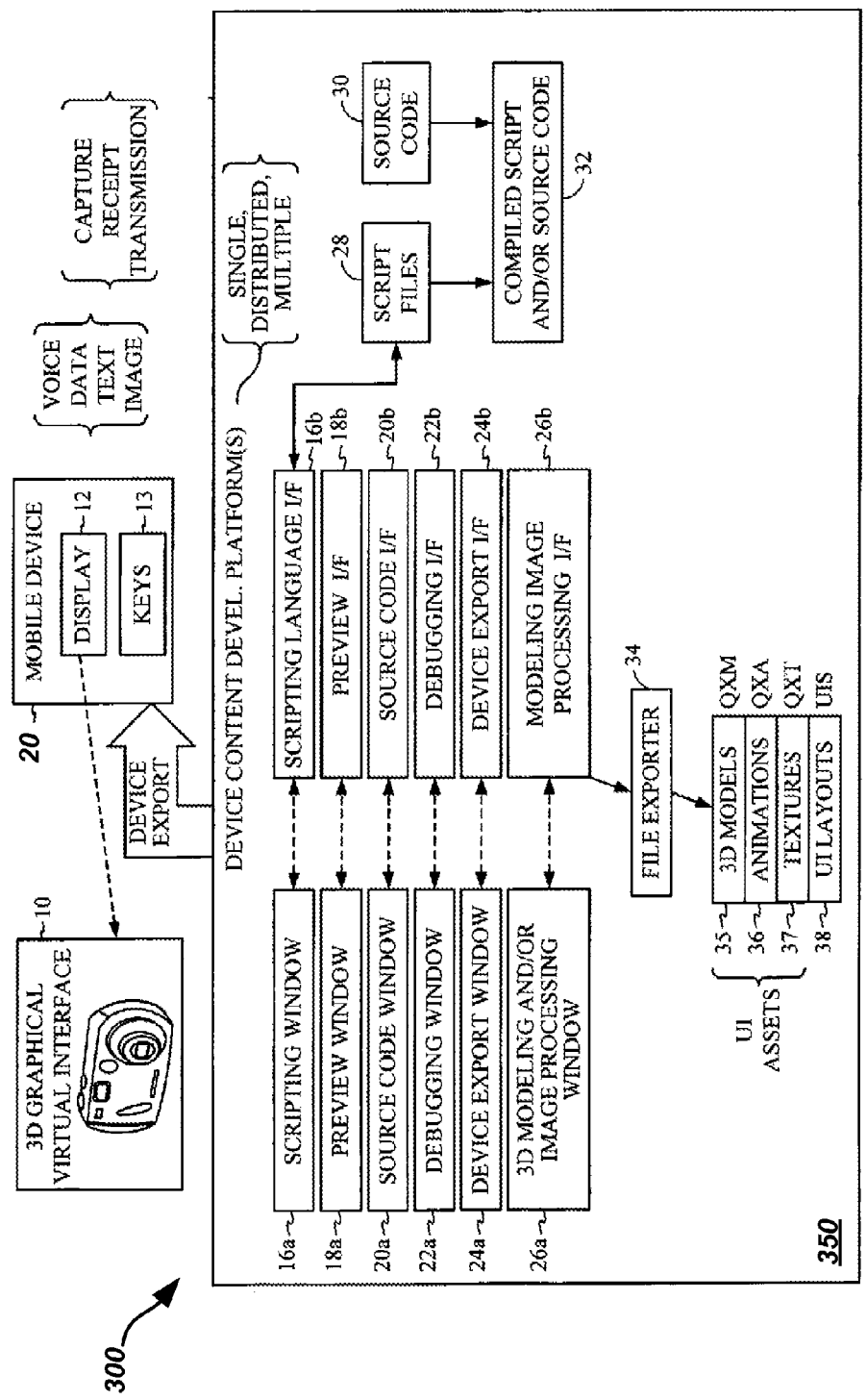
FIG. 3B illustrates additional details of the authoring framework of FIG. 3A.

Attention is now directed to FIG. 3B, which illustrate additional details of an embodiment of a content development system 300, in this case configured to generate and edit 3D applications. The illustrated system 300 may include a mobile device content development platform or platforms 350, a mobile device 20, and a 3D graphical virtual interface 10 which may be displayed on a display 12 of mobile device 20.

As described previously, mobile device 20 may, for example, be a mobile or cellular phone. The illustrated mobile device 20 is an embedded device, which may be configured to capture, receives, and/or transmits voice, data, text, and/or images. The illustrated mobile device 20 may further includes keys 13 (or other interfaces such as touch screens, mice, etc.), to allow the control of mobile device 20 and the input of information into mobile device 20.

In various embodiments, the illustrated device content development platform(s) may be single, distributed, or multiple platforms. The illustrated platform(s) include a number of software interfaces which interact with and provide corresponding windows or screen displays on a computer platform monitor or other display device, such as monitor 330 of FIG. 3A. These may include a scripting window 16a and a corresponding scripting language interface 16b. A preview window 18a may be provided which corresponds to a preview interface 18b. A source code window 20a may be provided which corresponds to a source code interface 20b. A debugging window 22a may be provided which corresponds to a debugging interface 22b. A device export window 24a may be provided which corresponds to a device export interface 24b. A 3D modeling and/or image processing window 26a may be provided which corresponds to a modeling/image processing interface 26b.

The illustrated 3D graphical virtual interface 10 graphically portrays and simulates a physical device with its interface components, and therefore, may serve as a 3 dimensional (3D) user interface, with icons embedded therein.

Scripting language interface 16b may be coupled to, and generates, one or more script files 28, which cater to the building of 3D user interfaces. Those script files 28 provide information for 3D icon and scene definition as well as for programming the animation of the defined 3D icons and scenes. The 3D icons and scenes, as animated, may be tied to or associated with mobile device 20, and tools thereof, to control or input and/or to display or output various mobile device operations, settings, events, and/or statuses.

Each of the interfaces 16b, 18b, 20b, 22b, 24b, and 26b may be operable, through the use of its corresponding window, to receive controls and information via a computer screen and to display information to the user.

Preview interface 18b may cause a viewer to load textures and animations. All files associated with a particular 3D model may be played, along with material animations and hierarchical animations of that 3D model.

Source code interface 20b, in connection with the source code window 20a, may allow for the creation of a program using source code, typically using commands provided in code provided for original equipment manufacturers (OEMs).

Debugging interface 22b, interacting with debugging window 22a, may be used to facilitate the simulation of script files 28 for purposes of checking and debugging the script file. Device export interface 24b, together with device export window 24a, may allow a user to cause compiled script and/or source code to be exported to a mobile device 20.

Modeling/imaging processing interface 26b may include software for allowing an artist to perform 3D modeling and/or imaging processing through the use of 3D modeling and/or imaging processing window 26a, to create 3D assets for conversion into user interface assets and for the definition of user interface layouts to form and ultimately define a 3D user interface.

Scripting language interface 16b may produce script files 28, while source code interface 20b may produce source code 30. Either or each of these types of code may be compiled to produce compiled script and/or source code 32.

A file exporter 34 may be provided to export files, i.e., convert such files, from modeling/image processing interface 26b into certain types of files that can be usable by the compiled script and/or source code 32 to create a particular type of 3D user interface which can be exported to mobile device 20. The "exporting" performed by file exporter 34 may be distinct from the exporting performed by a device export interface

24*b*, in that the file exporter 34 simply converts information into files that are compatible with the compiled script and/or source code 32 (and also usable by a graphics engine that operates in accordance with the compiled code), while the device export interface 24*b* facilitates the physical exporting of such compiled script and/or source code, and associated user interface assets and user interface layout files, into mobile device 11.

In the illustrated embodiment, file exporter 34 exports information from modeling/image processing interface 26*b* into a set of files defining user interface assets 35, 36, and 37, and a set of files defining user interface layouts 38. Specifically the user interface assets include 3D models 35, animations 36, and textures 37. Modeling/image processing interface 26*b* and the corresponding 3D modeling and/or image processing window 26*a* may be implemented with standard software that is commercially available. For example, such standard software may include, for example, Maya.

Figure 4:
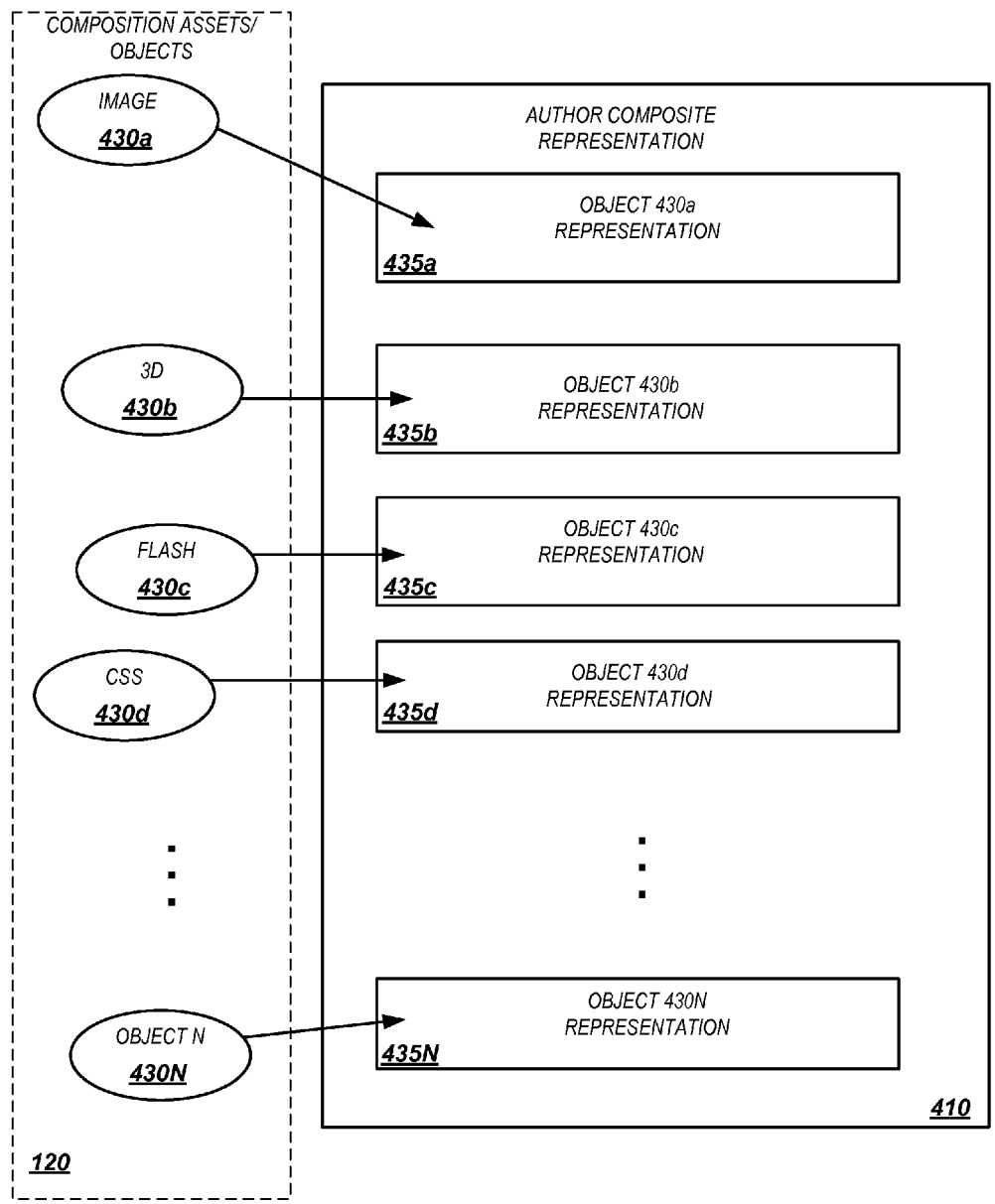
FIG. 4 illustrates an receipt and in-memory storage of source assets in an authoring framework.

Attention is now directed to FIG. 4, which illustrates details of asset import and storage in an authoring system such as framework 300 as shown in FIGS. 3A and 3B. Multiple source assets 430*a*-430N, which may correspond to source assets 120 of FIG. 1, may be imported into the authoring framework, resulting in a composite representation 410 stored in a memory space in framework 300, such as memory space 350. In the illustrated example, the composite representation may contain in-memory representations of the various source assets, which may be provided to the authoring system from multiple users and sources as noted previously.

Each received source asset 430*a*-430N may have a corresponding memory representation 435*a*-435N as shown in FIG. 4. Moreover, the representations 435 may be generated upon receipt of the assets and may be translated or converted to a canonical form representation. The canonical form may be generated based on characteristics of the associated graphics engine on which a generated device application will operate (which may be, for example, a particular graphics processor incorporated in a particular cellular phone or other device). This approach may facilitate flexibility and upgradeability for the authoring system by allowing various canonical forms to be selected for use in the authoring environment based on a particular target graphics engine and its associated performance characteristics.

Figure 5:
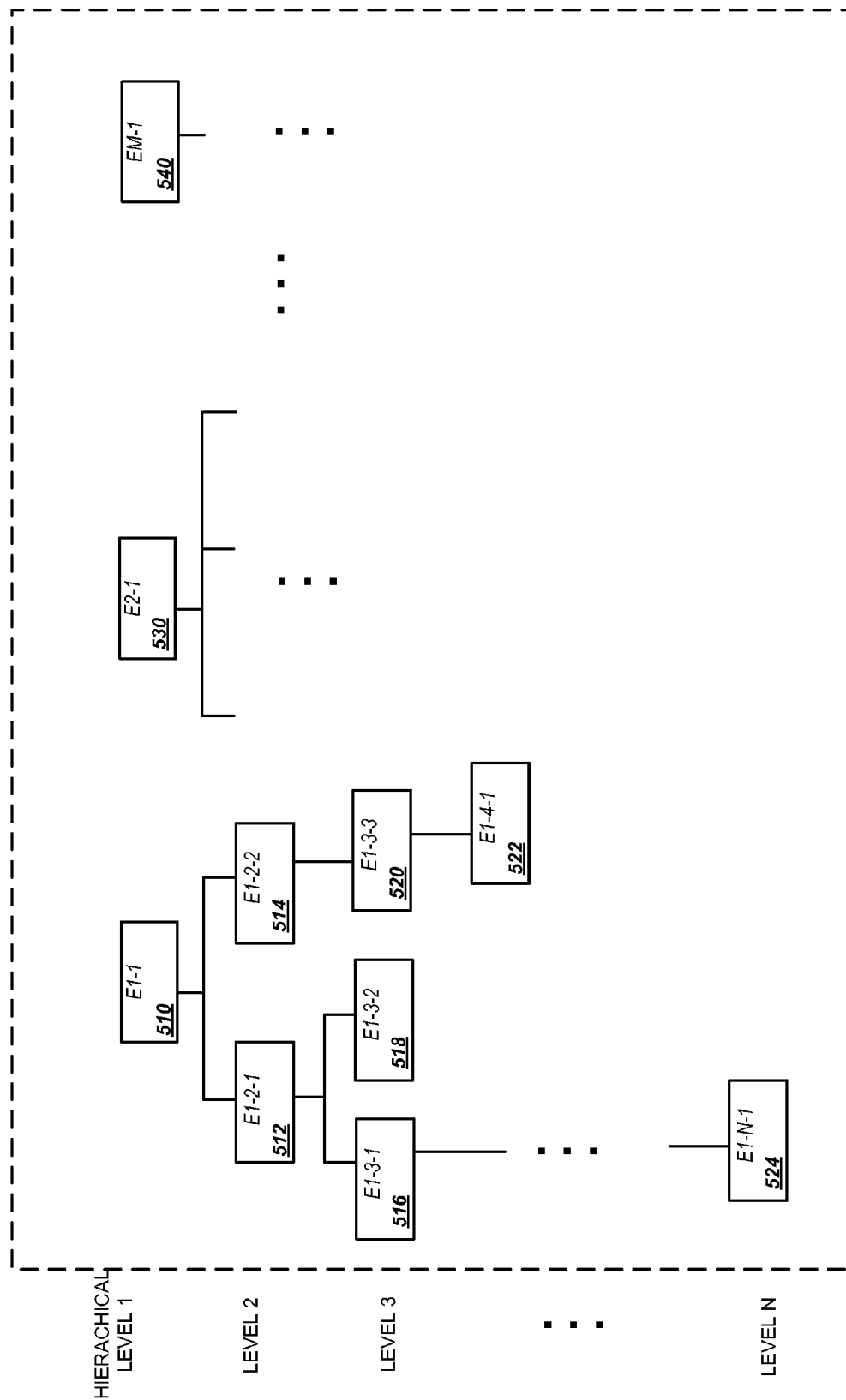
FIG. 5 illustrates a hierarchical representation of assets and associated sub-assets.

As noted previously, the various received assets may be configured to include sub-assets that may be represented in the authoring framework in a hierarchical form. An example is shown in FIG. 5, which illustrates M assets (denoted as E1, E2 thru EM), which each may include sub-assets at multiple hierarchical levels (shown as levels 1-N). For example, asset E1 includes one element E1-1 at the first hierarchical level, two sub-assets E1-2-1 and E1-2-2 at the second level, 3 assets at the third level, and additional assets at lower levels. The set of assets within a project can be viewed in this way as comprising a hierarchical tree structure. Each asset may have a separate tree structure including sub-assets. In some implementations, assets may themselves be related to each other at various levels of the tree structure.

Figure 6A:
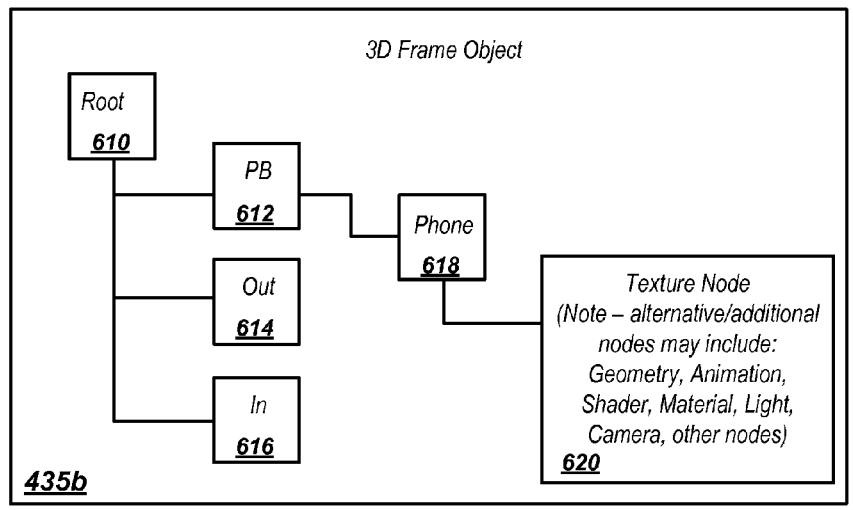
FIG. 6A illustrates an example hierarchical representation of a 3D asset.

FIG. 6A illustrates an addition example of a tree structure for 3D asset 435*b* of FIG. 4, and Flash asset 435*c*. Nodes may vary or not for parents and sibling.

Figure 7:
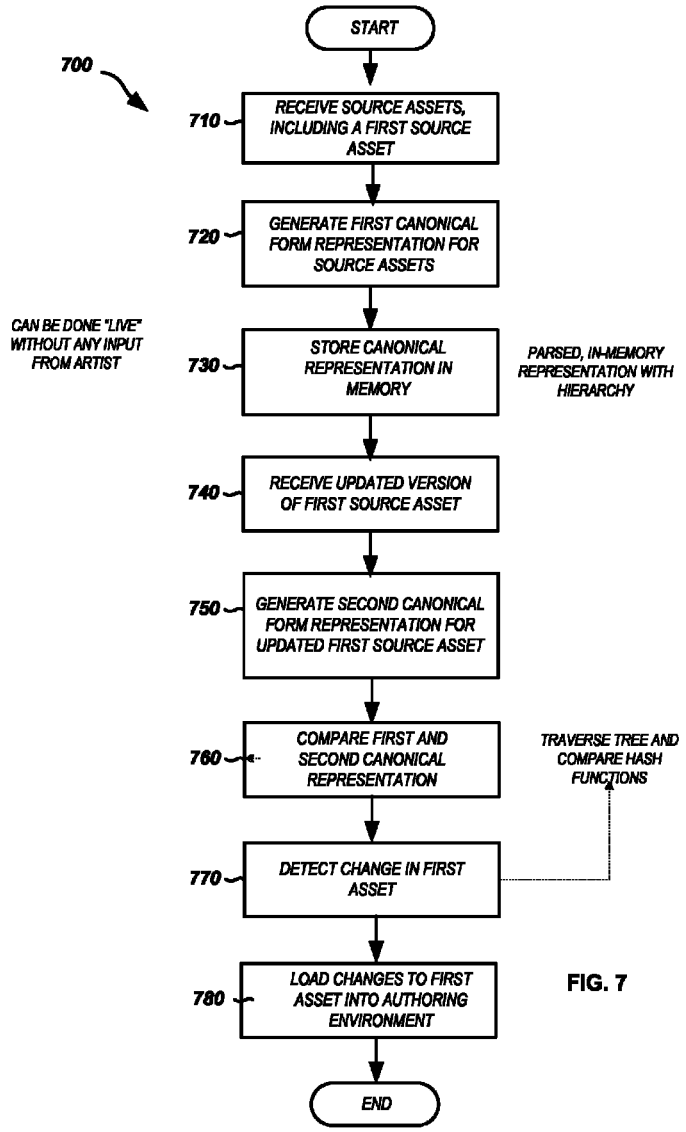
FIG. 7 illustrates an embodiment of a process for detecting changed assets in an authoring framework.

FIG. 7 illustrates an embodiment of a process 700 for detecting changes in assets in an authoring system, such as system 300. At stage 710, one or more source assets may be received at the authoring system. The assets may be generated, as shown in FIG. 1, by multiple DCC applications, and include at least a first source asset. At stage 720, a first canonical form representation of the received assets may be generated, including at least a canonical form representation of the first source asset. The canonical form representation may include a hierarchical tree structure based on hierarchical relationships between sub-assets of the source assets, and/or between two or more of the source assets. The canonical form representation may be stored in a memory of the authoring system at stage 730, typically with the assets parsed into sub-assets based on the particular format type of the asset. The canonical form representation may be based at least in part on a characteristic of a target graphic engine comprising the device on which content provided by the authoring framework will be rendered, such as a graphics processor on a targeted mobile device.

An updated version of at least the first source asset may then be received at stage 740. A second canonical form representation for the updated source asset may be generated at stage 750. The second canonical form representation may similarly include a hierarchical representation of sub-assets of the updated first source asset.

At stage 760, the first and second canonical form representations may be compared to detect at stage 770 whether the first source asset, and/or any sub-assets of the first source asset, may be changed. As further described below, this may be done by generating a function, such as a hash function, for the assets and/or sub-assets in the hierarchical tree structure, and comparing the function values from before and after receipt of the updated first source asset. This may be done by traversing the hierarchical tree structure and updated only sub-assets below a particular asset or sub-asset that has changed.

At stage 780, the authoring environment may be updated based on the updated first source asset. This may be a partial reload of only assets or sub-assets that have changed responsive to receipt of the updated first source asset.

Figure 6B:
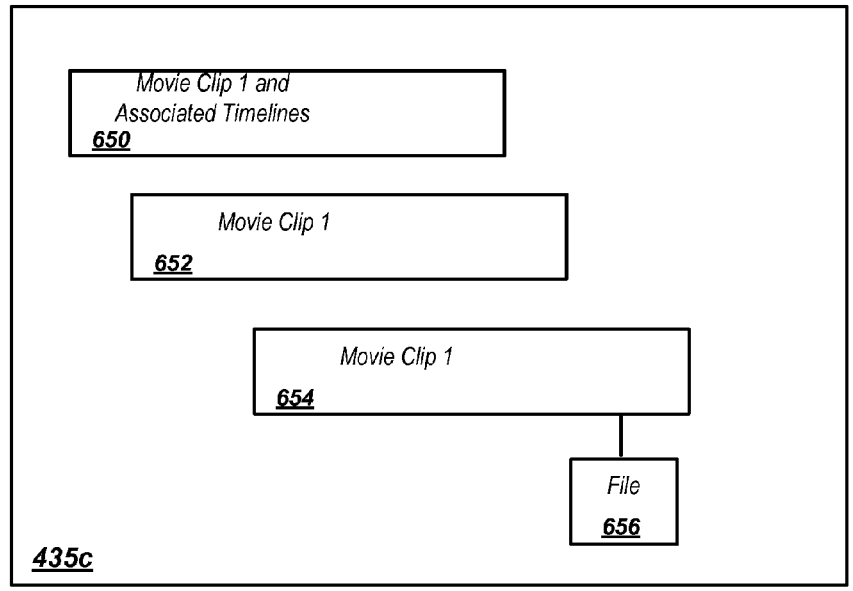
FIG. 6B illustrates an example hierarchical representation of a Flash asset.
Figure 8:
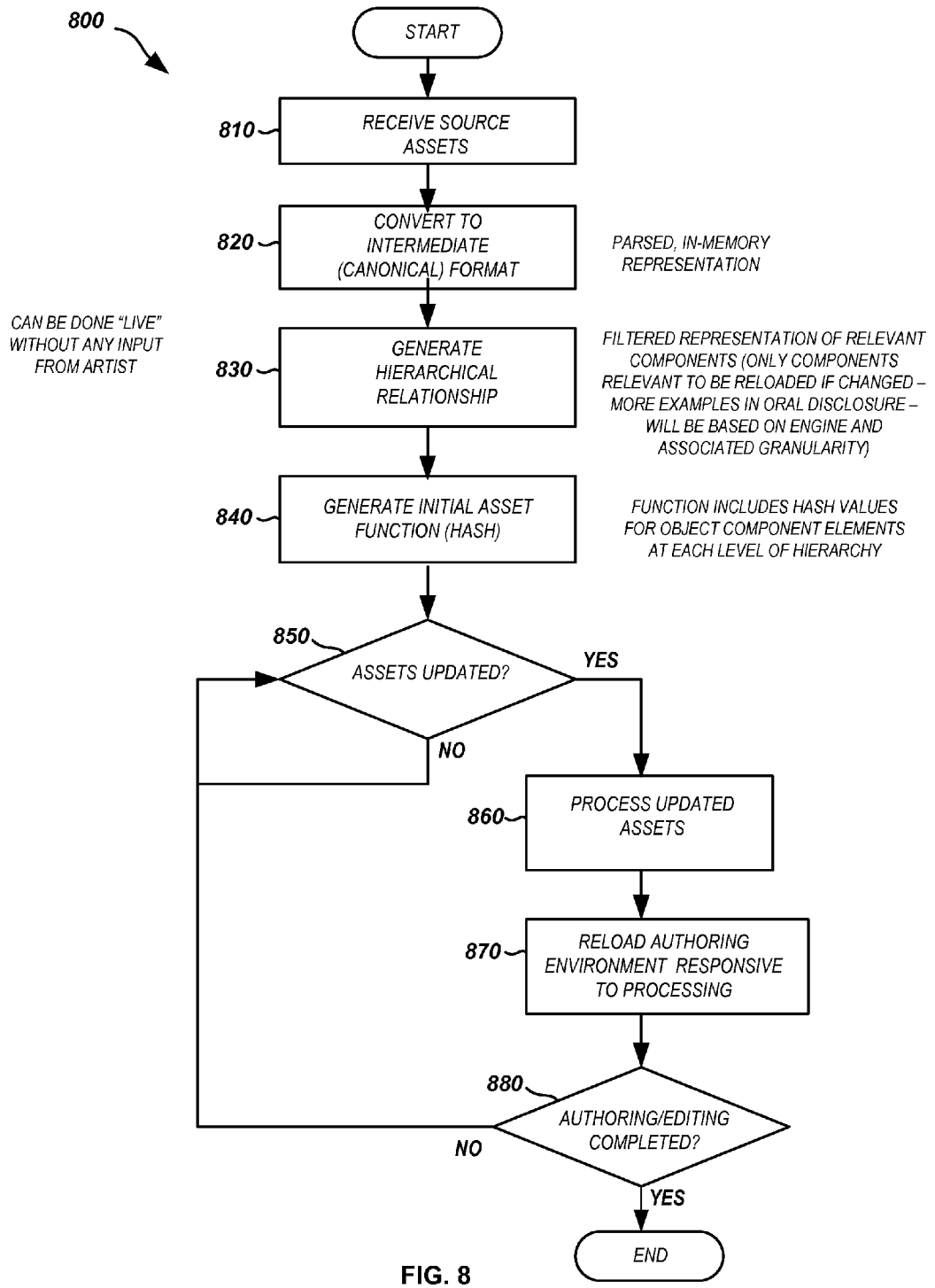
FIG. 8 illustrates an embodiment of a process for partial asset loading in an authoring system.

Attention is now directed to FIG. 8, which illustrates details of an embodiment of a process 800 for reloading an authoring environment based on changes in received assets. At stage 810, one or more source assets may be received. These may be converted at stage 820 to an intermediate, canonical form representation. The canonical form representation may be based on a characteristic of a graphics engine on which exported applications or content may be rendered, such as a graphics processor on a targeted mobile device. At stage 830, a hierarchical relationship between sub-assets within one or more of the assets, and/or multiple assets, may be generated. This may be in the form of a hierarchical tree structure, such as shown in FIGS. 5, 6A and 6B. At stage 840, a function based on the assets and/or sub-assets in the tree structure may be applied to generate corresponding function values. This may be, for example, a set of hash values for sub-assets at various levels of the tree structure. Once the hierarchical tree and associated function values have been determined, they can later be compared with updated function values for assets or sub-assets in the hierarchical tree to determine which assets or sub-assets have changed.

For example, one or more updated source assets may be received at the authoring framework. This may be, for example, in response to an authoring edit action to regenerate the asset, such as shown by the iteration path of FIG. 1. Upon receipt the updated asset, a determination may be made at stage 850 by comparing hash values for sub-assets or elements within the tree structure before and after receipt of the updated asset. The updated assets may then be processed at stage 860, such as to replace previous assets with the updated assets. Alternately, or in addition, processing may include prioritizing updated assets based on display criteria such as relative amount of change, visibility, and/or other criteria.

At stage 870, the authoring framework may then be updated based on the updated asset or assets. For example, the authoring framework may be partially updated by reloading only assets that have been updated, and/or only assets that are both visible and have been updated.

Figure 9:
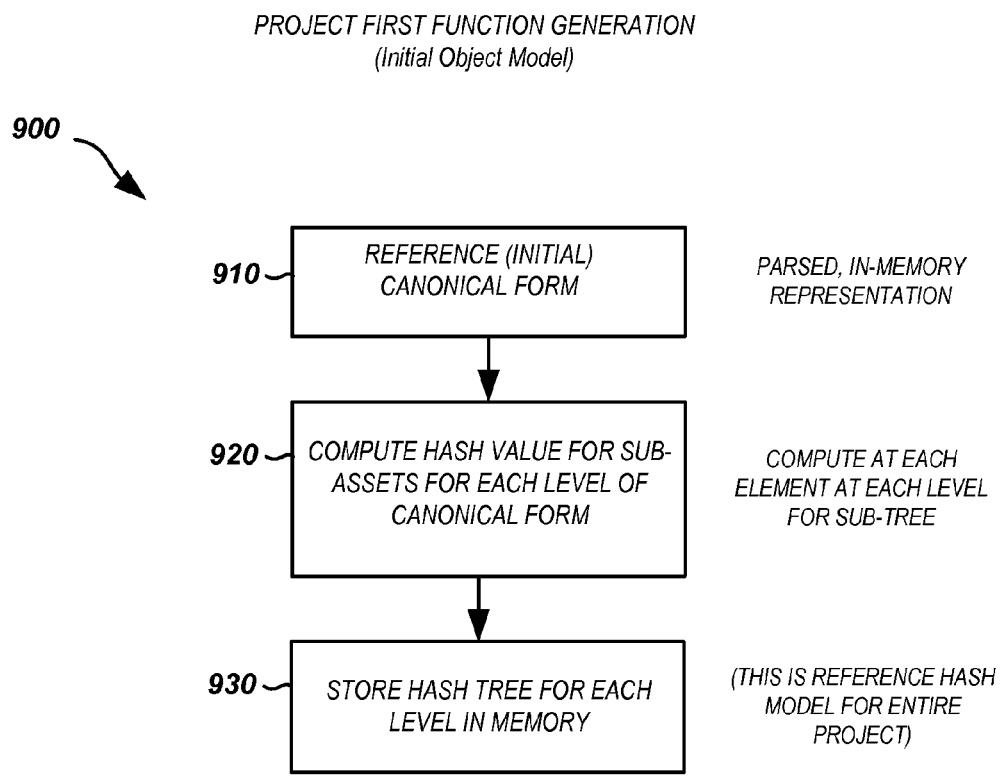
FIG. 9 illustrates an embodiment of a process for generating a function representing a hierarchical tree of source assets.

FIG. 9 illustrates additional details of a process for applying a function to received source assets or sub-assets. In an exemplary embodiment, the function may be a hash function of sub-asset values in a sub-asset hierarchical representation. The hash function may include values from each sub-asset as well as additional sub-assets lower in the hierarchical tree. At stage 910, a reference (initial) canonical form of a received asset may be generated. The canonical form will typically include a hierarchical arrangement of sub-assets in the received asset, such as shown in FIGS. 5, 6A and 6B. In some cases, the canonical form representation will include all or most of the data or information in the sub-asset; however, in general, the canonical form will include a reduced set of data or information based on performance capabilities of the authoring system and/or a graphics engine on a device on which output content is to be rendered. At stage 920, a hash function may be applied to each sub-asset in the hierarchical representation, which may be in the form of a hierarchical tree (denoted as a hash tree or hash value tree). The hash tree may then be stored in memory for later processing in response to updated assets or sub-assets.

Figure 10:
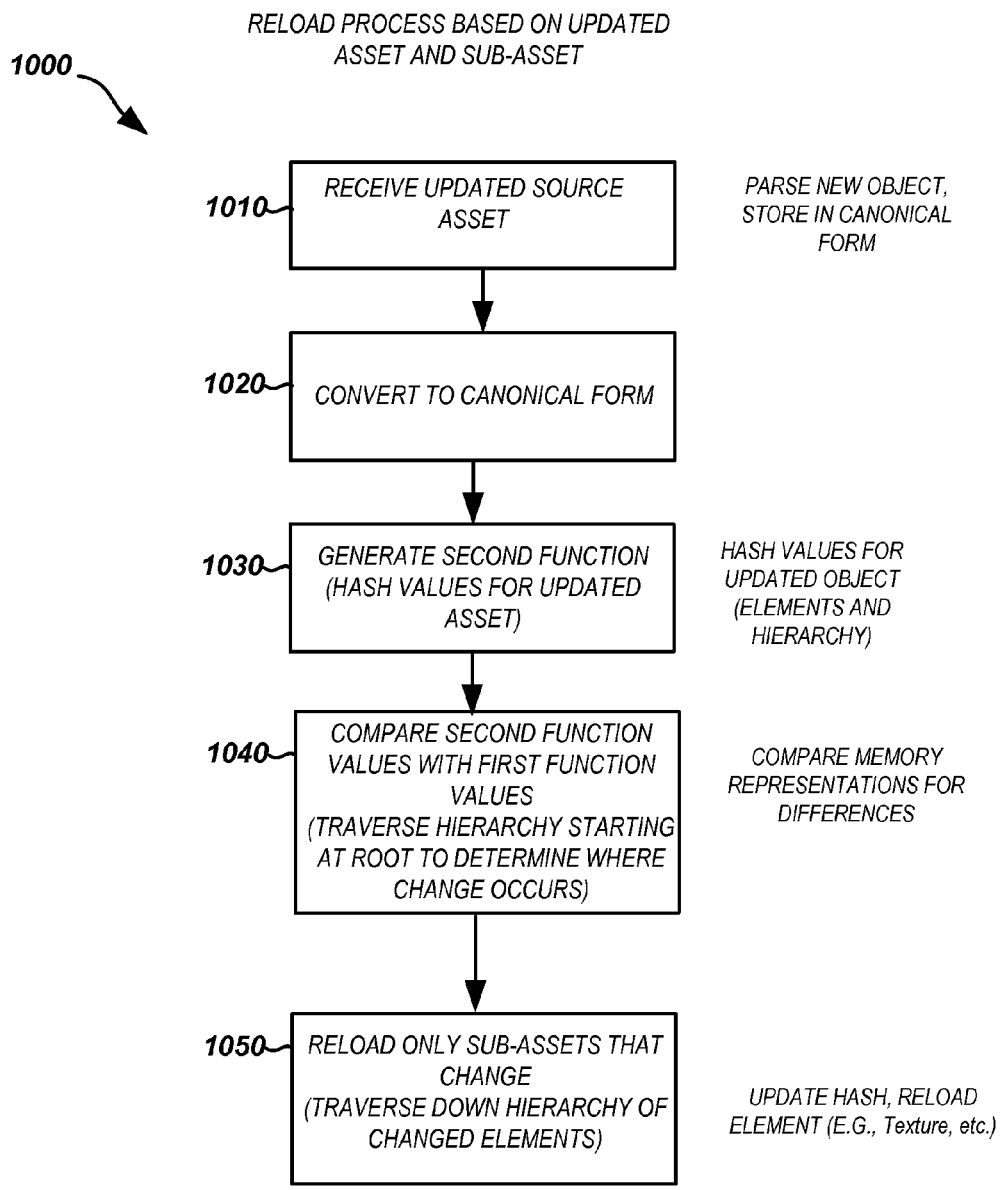
FIG. 10 illustrates an embodiment of a process for reloading sub-assets that have been updated.

FIG. 10 illustrates an embodiment of a process 1000 for partial reloading of an authoring environment in response to receipt of an updated asset. At stage 101, an updated source asset may be received at the authoring system. The updated asset may be converted at stage 1020 to a canonical form, such as is described previously herein. At stage 1030, a function, such as a hash function, may be applied to the updated asset. This may be done by, for example, applying a hash function to the updated asset and any lower sub-assets in the asset hierarchical representation to generate updated function/hash values. At stage 1040, the updated function values may be compared to the previous values to determine which sub-assets have changed. This may be done by, for example, traversing a first hierarchical tree representation of the source assets and comparing function values before and after receipt of the updated asset. At stage 1050, only sub-assets that have changed may be reloaded. This may be done by, for example, traversing the hierarchical tree downward from any changed sub-assets and reloading only those changed sub-assets.

Figure 11:
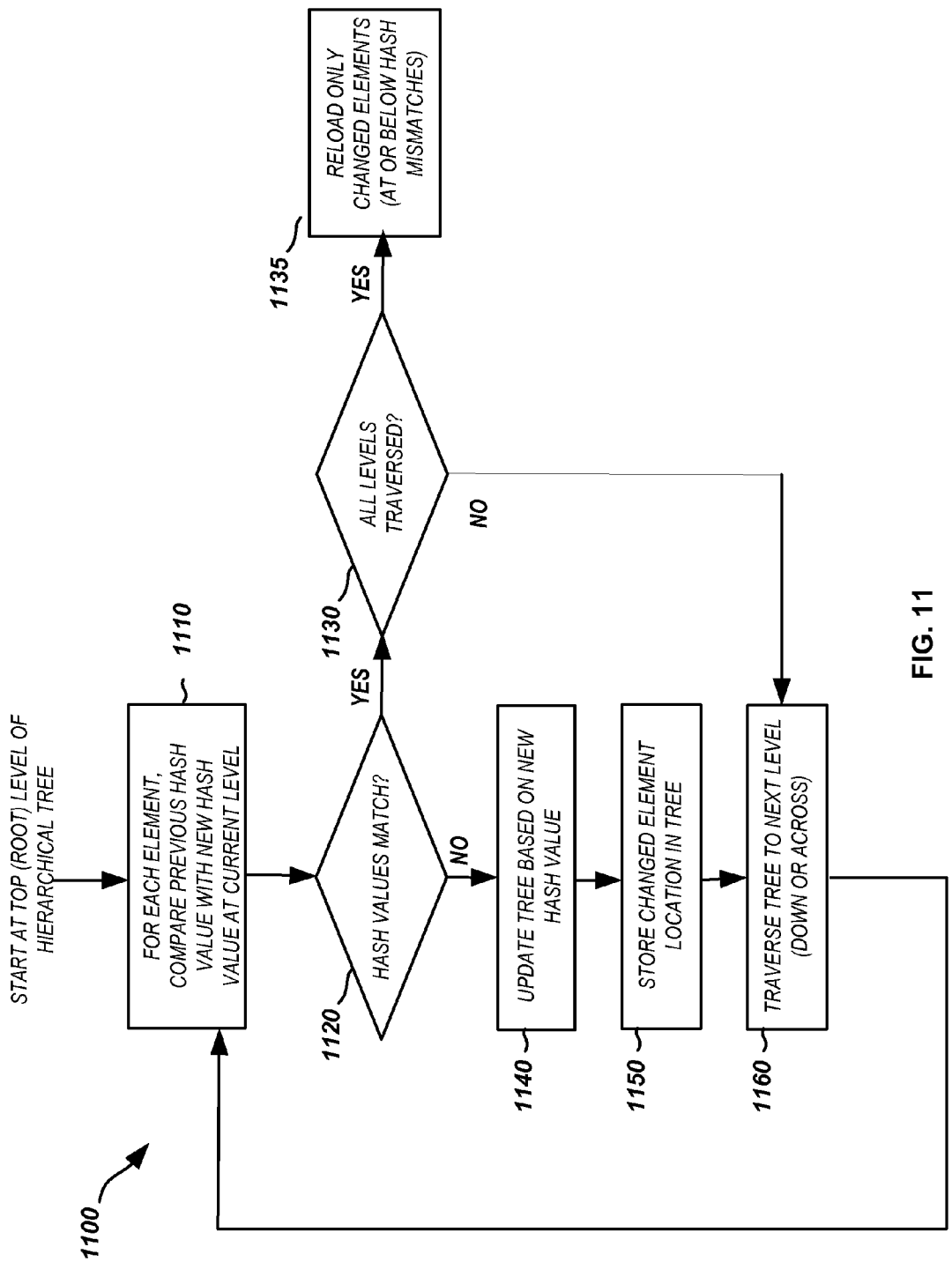
FIG. 11 illustrates an embodiment of a process for reloading sub-assets based on hash values.

Attention is now directed to FIG. 11, which illustrates details of an embodiment of a process 1100 for traversing a hierarchical asset tree to detect changed sub-assets. For a current element, at block 1110, a previous hash value is compared to a new hash value. If it is determined, at block 1120, that the hash values match, and then the process 1100 determines whether all levels have been traversed at block 1130. If all levels have been traversed, the process 1100 advances to block 1135. If all levels have not been traversed, the process proceeds to block 1160, and restarts process 1100 for the next element, which is either next to or below the current element. Next, at block 1135, elements that have changed are reloaded at or below hash mismatches.

If, at block 1120, the hash values do not match and therefore a change to the element has been detected, the process 1100 proceeds to block 1140, where the hierarchical tree is updated based on the new hash value. At block 1150, the changed element is stored in the hierarchical tree. Next, at step 1160, the process 1100 traverses the hierarchical tree to the next element, which is either next to or below the current element.

Figure 12:
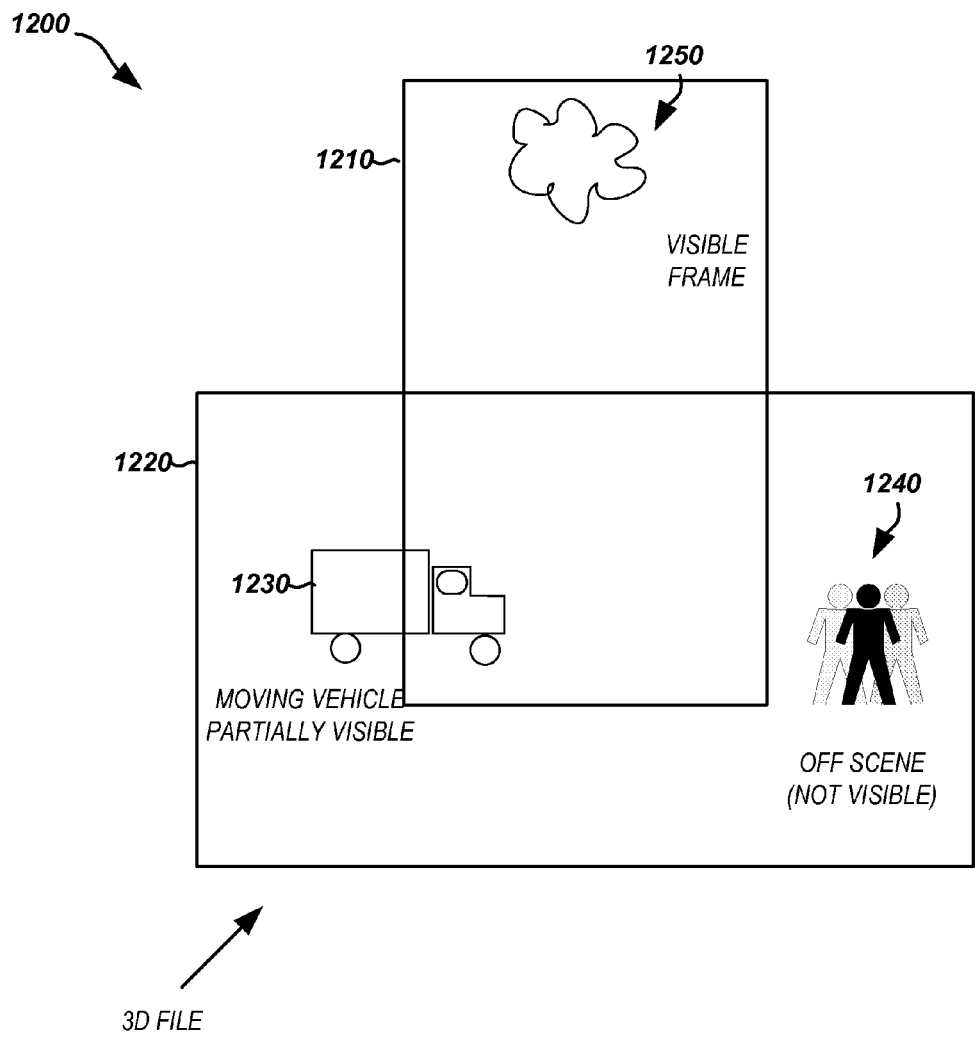
FIG. 12 illustrates an example of visible and non-visible representations of assets in a 3D view.

In some implementations assets may be reloaded based on additional criteria such as visibility on the targeted device display and/or overlap. An example of this is shown in FIG. 12, which illustrates an example device display boundary 1210. A source asset file may contain the representation shown in 1220, which may be, for example, a 3D file. The boundaries of the source asset may extend beyond the display boundary as shown. For example, as shown in FIG. 12, one or more people (or other graphics elements) 1240, which may, for example, be represented in vector format, may be off-screen or outside the visible display boundaries. Alternately, one or more other objects, such as cloud object 1250, may be entirely within the display boundaries. Finally, one or more other objects, such as moving vehicle object 1230, may be moving into, across, and/or out of the display area.

In reloading these various objects, reloading may be prioritized based on the visibility of the objects. For example, completely visible cloud object 1250 may be given a higher priority than partially visible vehicle object 1230. Alternately, a moving object, such as vehicle 1230 may be given a higher priority due to rapid change. Finally, off-screen objects, such as person object 1240, may be given a low priority due to lack of visibility. This may be advantageous in reducing processing and reloading based on non-visible objects.

Figure 13:
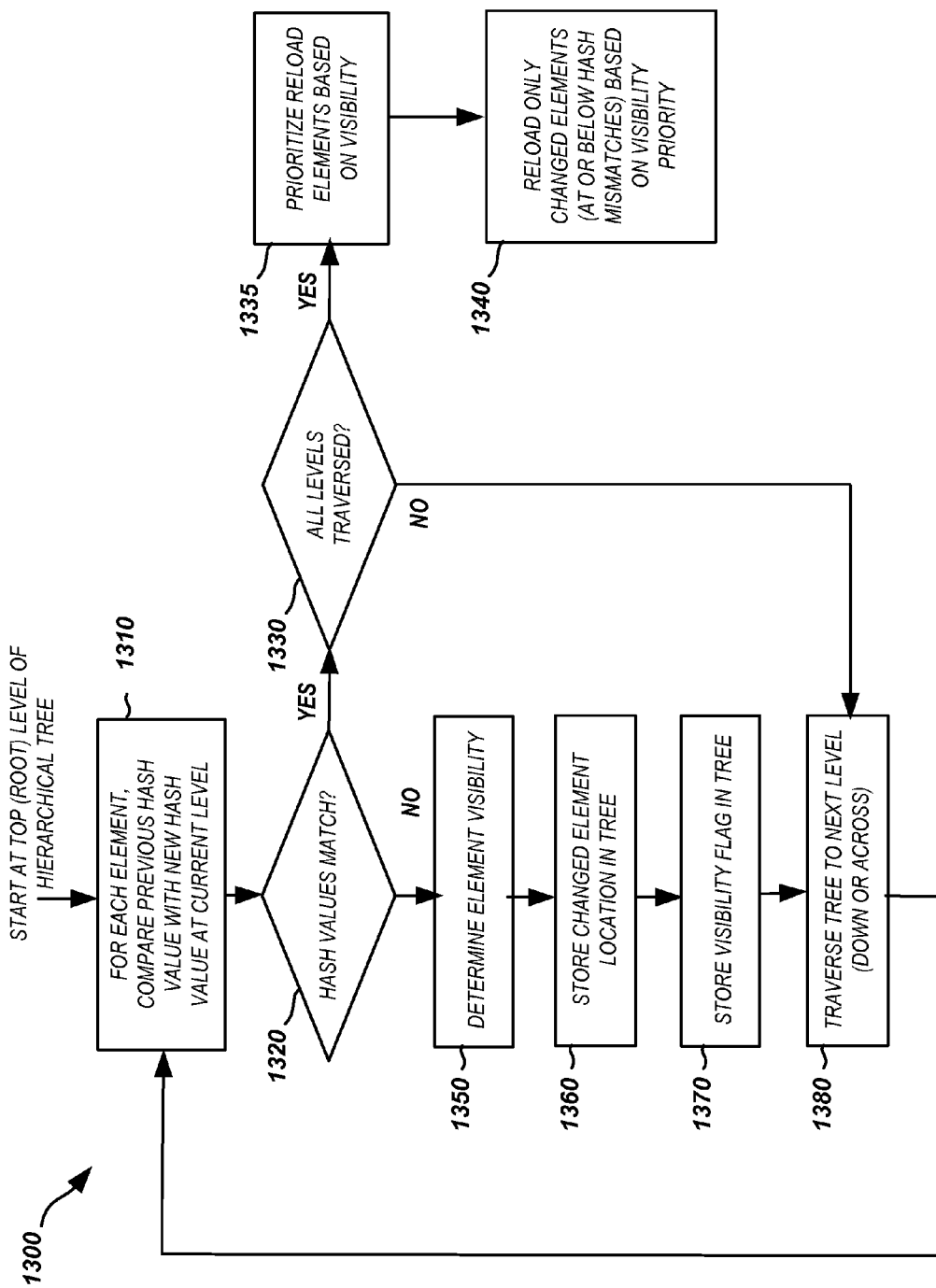
FIG. 13 illustrates an embodiment of a process for reloading sub-assets that have been updated, including visibility priority loading.

Attention is now directed to FIG. 13, which illustrates details of an embodiment of a process 1300 for traversing a hierarchical asset tree to detect changed sub-assets. For a current element, at block 1310, a previous hash value is compared to a new hash value. If it is determined, at block 1320, that the hash values match, and then the process 1300 determines whether all levels have been traversed at block 1330. If all levels have been traversed, the process 1300 advances to block 1335. If all levels have not been traversed, the process proceeds to block 1380, and restarts process 1300 for the next element, which is either next to or below the current element. Next, at block 1335, reloading of elements that have certain visibility characteristics is prioritized over reloading of elements that have other visibility characteristics. One characteristic may be that the element is not in the visible frame. Another characteristic may be that the element is in the foreground or background of the visible frame. Still, another characteristic may be that the element is moving. One of skill in the art will appreciate various characteristics within both the scope and spirit of the invention. At block 1340, only elements that have changed are reloaded. The reloading of multiple elements is based on the prioritization from block 1335.

If, at block 1320, the hash values do not match and therefore a change to the element has been detected, the process 1300 proceeds to block 1350, where element visibility is determined. At block 1360, the changed element is stored in the hierarchical tree. At block 1370, a flag is stored in the hierarchical tree. This flag is indicative of the element's visibility characteristic. Next, at step 1380, the process 1300 traverses the hierarchical tree to the next element, which is either next to or below the current element.

Figure 14:
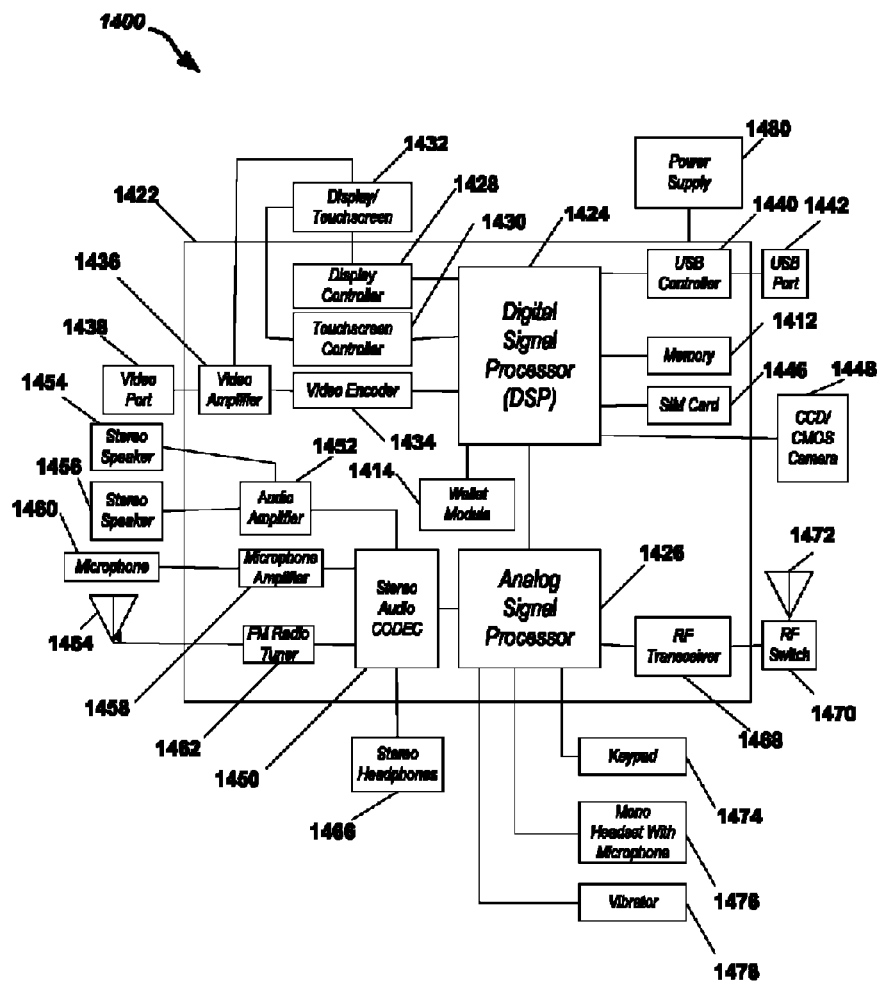
FIG. 14 illustrates an exemplary client device that comprises a mobile telephone.

Referring now to FIG. 14, this figure illustrates an exemplary, non-limiting aspect of a client device 1400 comprising a wireless telephone which may correspond with FIGS. 2A & 2B. As shown, the client device 1400 includes an on-chip system 1422 that includes a digital signal processor 1424 and an analog signal processor 1426 that are coupled together. As illustrated in FIG. 14, a display controller 1428 and a touch screen controller 1430 are coupled to the digital signal processor 1424. A touch screen display 1432 external to the on-chip system 1422 is coupled to the display controller 1428 and the touch screen controller 1430.

FIG. 14 further indicates that a video encoder 1434, e.g., a phase-alternating line ("PAL") encoder, a sequential couleur avec memoire ("SECAM") encoder, a national television system(s) committee ("NTSC") encoder or any other video encoder, is coupled to the digital signal processor 1424. Further, a video amplifier 1436 is coupled to the video encoder 1434 and the touch screen display 1432. A video port 1438 is coupled to the video amplifier 1436. As depicted in FIG. 14, a universal serial bus ("USB") controller 1440 is coupled to the digital signal processor 1424. Also, a USB port 1442 is coupled to the USB controller 1440. A memory 1412 and a subscriber identity module ("SIM") card 1446 may also be coupled to the digital signal processor 1424. Further, as shown in FIG. 14, a digital camera 1448 may be coupled to the digital signal processor 1424. In an exemplary aspect, the digital camera 1448 is a charge-coupled device ("CCD") camera or a complementary metal-oxide semiconductor ("CMOS") camera.

As further illustrated in FIG. 14, a stereo audio CODEC 1450 may be coupled to the analog signal processor 1426. Moreover, an audio amplifier 1452 may be coupled to the stereo audio CODEC 1450. In an exemplary aspect, a first stereo speaker 1454 and a second stereo speaker 1456 are coupled to the audio amplifier 1452. FIG. 14 shows that a microphone amplifier 1458 may be also coupled to the stereo audio CODEC 1450. Additionally, a microphone 1460 may be coupled to the microphone amplifier 1458. In a particular aspect, a frequency modulation ("FM") radio tuner 1462 may be coupled to the stereo audio CODEC 1450. Also, an FM antenna 1464 is coupled to the FM radio tuner 1462. Further, stereo headphones 1466 may be coupled to the stereo audio CODEC 1450.

FIG. 14 further indicates that a radio frequency ("RF") transceiver 1468 may be coupled to the analog signal processor 1426. An RF switch 1470 may be coupled to the RF transceiver 1468 and an RF antenna 1472. The RF transceiver 1468 may communicate with mobile telephone networks as well as satellites to receive global positioning system ("GPS") signals. As shown in FIG. 14, a keypad 1474 may be coupled to the analog signal processor 1426. Also, a mono headset with a microphone 1476 may be coupled to the analog signal processor 1426. Further, a vibrator device 1478 may be coupled to the analog signal processor 1426. FIG. 14 also shows that a power supply 1480 may be coupled to the on-chip system 1422. In a particular aspect, the power supply 1480 is a direct current ("DC") power supply that provides power to the various components of the client device 1402 that require power. Further, in a particular aspect, the power supply is a rechargeable DC battery or a DC power supply that is derived from an alternating current ("AC") to DC transformer that is connected to an AC power source.

FIG. 14 also shows that the client device 1400 may include a wallet module 1414. The wallet module 1414 may communicate with the client device management server 1406 to update wallet information stored in the client device 1402. As depicted in FIG. 14, the touch screen display 1432, the video port 1438, the USB port 1442, the camera 1448, the first stereo speaker 1454, the second stereo speaker 1456, the microphone 1460, the FM antenna 1464, the stereo headphones 1466, the RF switch 1470, the RF antenna 1472, the keypad 1474, the mono headset 1476, the vibrator 1478, and the power supply 1480 are external to the on-chip system 1422.

In a particular aspect, one or more of the method steps described herein may be stored in the memory 1412 as computer program instructions. These instructions may be executed by the digital signal processor 1424, the analog signal processor 1426, or another processor, to perform the methods described herein. Further, the processors, 1424, 1426, the memory 1412, the instructions stored therein, or a combination thereof may serve as a means for performing one or more of the method steps described herein.

Aspects of the present invention may be used in relation to standards, multi-media platforms, file formats, video game engines and other equivalents. For example, content authored in relation to any or all of the various aspects of the present invention may relate to HTML 5, Flash, Scalable Vector Graphics (SVG), video game engines (e.g., Quake, Unreal, etc.) and any other equivalents.

In the previous example embodiments, small numbers of assets are shown in the various examples for purposes of clarity. Nevertheless, in various implementations, large number of assets, each of which may be complex assets including many sub-assets and many hierarchical levels, may be advantageously be processed in an authoring system, or other similar or equivalent system, as described previously herein.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps in the processes disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. It is intended that the following claims and their equivalents define the scope of the invention.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

It is intended that the following claims and their equivalents define the scope of the invention.

We claim:

1. A computer-implemented method for processing only scene-related information in an editing environment, the method comprising:
receiving a first source asset containing first scene information defining at least a portion of a scene for a graphical image displayed on a display device;
generating a first canonical representation having a plurality of sub-assets corresponding to the first source asset and based on one or more characteristics of a graphics engine that renders the scene;
receiving an updated version of the first source asset which contains updated first scene information;
generating a first updated canonical representation having a plurality of sub-assets corresponding to the updated version of the first source asset;
comparing the first canonical representation and the first updated canonical representation by: computing a first set of hash values based upon the plurality of sub-assets for the first canonical representation and a second set of hash values based upon the plurality of sub-assets for the first updated canonical representation, and comparing ones of the first set of hash values and respective ones of the second set of hash values; and
detecting, based upon the comparing, that the first source asset has been updated.

2. The method of claim 1, further including: receiving a second source asset containing second scene information defining at least another portion of the scene; receiving an updated version of the second source asset containing updated second scene information; comparing representations of the second source asset and the updated version of the second source asset; and detecting, based upon the comparing, that the second source asset has been updated.

3. The method of claim 2, wherein the comparing includes comparing a second canonical representation corresponding to the second source asset and an updated second canonical representation corresponding to the updated second source asset.

4. The method of claim 1, further including loading, in response to the detecting, a selected portion of the updated version of the first source asset into the editing environment.

5. The method of claim 1, wherein the detecting further includes determining that a first sub-asset and a second sub-asset of the first source asset have been updated, the method further including selectively loading an updated version of the first sub-asset and an updated version of the second sub-asset into the editing environment.

6. The method of claim 1, wherein the plurality of sub-assets are organized in accordance with a hierarchical relationship, the comparing including comparing the ones of the first set of hash values and the respective ones of the second set of hash values in an order determined by the hierarchical relationship.

7. The method of claim 1, wherein the detecting includes identifying differences between ones of the first set of hash values and corresponding ones of the second set of hash values.

8. The method of claim 1, wherein ones of the first set of hash values are arranged in a hierarchical relationship and are associated with corresponding hierarchical levels of the plurality of sub-assets.

9. The method of claim 8, wherein the comparing includes comparing ones of the second set of hash values with corresponding ones of the first set of hash values to identify differences between the first set of hash values and the second set of hash values.

10. The method of claim 7, wherein one or more of the corresponding plurality of sub-assets are loaded into the editing environment responsive to said differences.

11. The method of claim 1, wherein the first canonical representation includes a hierarchical tree representation of a plurality of sub-assets of the first source asset, and wherein the first updated canonical representation includes an updated hierarchical tree representation of a corresponding plurality of sub-assets of the updated version of the first source asset.

12. The method of claim 7, further including loading, into the editing environment, selected portions of the updated version of the first source asset based upon the differences.

13. The method of claim 1, wherein one of the characteristics of the graphics engine is granularity.

14. The method of claim 1, wherein one of the characteristics of the graphics engine is memory capacity.

15. A computer system for processing only scene-related information in an editing environment, the system comprising:
a processor operable to:
receive a first source asset containing first scene information defining at least a portion of a scene for a graphical image displayed on a display device;
generate a first canonical representation having a plurality of sub-assets corresponding to the first source asset and based on one or more characteristics of a graphics engine that renders the scene;
receive an updated version of the first source asset which contains updated first scene information;
generate a first updated canonical representation having a plurality of sub-assets corresponding to the updated version of the first source asset;
compare the first canonical representation and the first updated canonical representation by: computing a first set of hash values based upon the plurality of sub-assets for the first canonical representation and a second set of hash values based upon the plurality of sub-assets for the first updated canonical representation, and comparing ones of the first set of hash values and respective ones of the second set of hash values; and
detect, based upon the comparing, that the first source asset has been updated.

16. The system of claim 15, wherein the processor is further operable to: receive a second source asset containing second scene information defining at least another portion of the scene; receive an updated version of the second source asset containing updated second scene information; compare representations of the second source asset and the updated version of the second source asset; and detect, based upon the comparing, that the second source asset has been updated.

17. The system of claim 16, wherein the processor is further operable to: compare a second canonical representation corresponding to the second source asset and an updated second canonical representation corresponding to the updated second source asset.

18. The system of claim 15, wherein the processor is further operable to: load, in response to the detecting, a selected portion of the updated version of the first source asset into the editing environment.

19. The system of claim 15, wherein the processor is further operable to: determine that a first sub-asset and a second sub-asset of the first source asset have been updated; and selectively loading an updated version of the first sub-asset and an updated version of the second sub-asset into the editing environment.

20. The system of claim 15, wherein the plurality of sub-assets are organized in accordance with a hierarchical relationship, and wherein the processor is further operable to: compare the ones of the first set of hash values and the respective ones of the second set of hash values in an order determined by the hierarchical relationship.

21. The system of claim 15, wherein the processor is further operable to: identify differences between ones of the first set of hash values and corresponding ones of the second set of hash values.

22. The system of claim 15, wherein ones of the first set of hash values are arranged in a hierarchical relationship and are associated with corresponding hierarchical levels of the plurality of sub-assets.

23. The system of claim 22, wherein the processor is further operable to: compare ones of the second set of hash values with corresponding ones of the first set of hash values to identify differences between the first set of hash values and the second set of hash values.

24. The system of claim 21, wherein one or more of the corresponding plurality of sub-assets are loaded into the editing environment responsive to said differences.

25. The system of claim 15, wherein the first canonical representation includes a hierarchical tree representation of a plurality of sub-assets of the first source asset, and wherein the first updated canonical representation includes an updated hierarchical tree representation of a corresponding plurality of sub-assets of the updated version of the first source asset.

26. The system of claim 21, wherein the processor is further operable to: load, into the editing environment, selected portions of the updated version of the first source asset based upon the differences.

27. The system of claim 22, wherein one of the characteristics of the graphics engine is granularity.

28. The system of claim 22, wherein one of the characteristics of the graphics engine is memory capacity.

29. A computer system having a processor for processing only scene-related information in an editing environment, the system comprising:
means for receiving a first source asset containing first scene information defining at least a portion of a scene for a graphical image displayed on a display device;
means for generating a first canonical representation having a plurality of sub-assets corresponding to the first source asset and based on one or more characteristics of a graphics engine that renders the scene;
means for receiving an updated version of the first source asset which contains updated first scene information;
means for generating a first updated canonical representation having a plurality of sub-assets corresponding to the updated version of the first source asset;
means for comparing the first canonical representation and the first updated canonical representation by: computing a first set of hash values based upon the plurality of sub-assets for the first canonical representation and a second set of hash values based upon the plurality of sub-assets for the first updated canonical representation, and comparing ones of the first set of hash values and respective ones of the second set of hash values; and
means for detecting, based upon the comparing, that the first source asset has been updated.

30. The system of claim 29, wherein the system further comprises: means for receiving a second source asset containing second scene information defining at least another portion of the scene; means for receiving an updated version of the second source asset containing updated second scene information; means for comparing representations of the second source asset and the updated version of the second source asset; and means for detecting, based upon the comparing, that the second source asset has been updated.

31. The system of claim 30, wherein the system further comprises: means for comparing a second canonical representation corresponding to the second source asset and an updated second canonical representation corresponding to the updated second source asset.

32. The system of claim 29, wherein the system further comprises: means for loading, in response to the detecting, a selected portion of the updated version of the first source asset into the editing environment.

33. The system of claim 29, wherein the system further comprises: means for determining that a first sub-asset and a second sub-asset of the first source asset have been updated; and means for loading an updated version of the first sub-asset and an updated version of the second sub-asset into the editing environment.

34. The system of claim 29, wherein the plurality of sub-assets are organized in accordance with a hierarchical relationship, and wherein the system further comprises: means for comparing including comparing the ones of the first set of hash values and the respective ones of the second set of hash values in an order determined by the hierarchical relationship.

35. The system of claim 29, wherein the system further comprises: means for identifying differences between ones of the first set of hash values and corresponding ones of the second set of hash values.

36. The system of claim 29, wherein ones of the first set of hash values are arranged in a hierarchical relationship and are associated with corresponding hierarchical levels of the plurality of sub-assets.

37. The system of claim 36, wherein the system further comprises: means for comparing ones of the second set of hash values with corresponding ones of the first set of hash values to identify differences between the first set of hash values and the second set of hash values.

38. The system of claim 35, wherein one or more of the corresponding plurality of sub-assets are loaded into the editing environment responsive to said differences.

39. The system of claim 29, wherein the first canonical representation includes a hierarchical tree representation of a plurality of sub-assets of the first source asset, and wherein the first updated canonical representation includes an updated hierarchical tree representation of a corresponding plurality of sub-assets of the updated version of the first source asset.

40. The system of claim 35, wherein the system further comprises: means for loading, into the editing environment, selected portions of the updated version of the first source asset based upon the differences.

41. The system of claim 29, wherein one of the characteristics of the graphics engine is memory capacity.

42. The system of claim 29, wherein one of the characteristics of the graphics engine is memory capacity.

43. A computer program product comprising a non-transitory computer usable medium having a computer readable program code embodied therein, said computer readable program code adapted to be executed to implement a method for processing only scene-related information in an editing environment, the method comprising:
receiving a first source asset containing first scene information defining at least a portion of a scene for a graphical image displayed on a display device;
generating a first canonical representation having a plurality of sub-assets corresponding to the first source asset and based on one or more characteristics of a graphics engine that renders the scene;
receiving an updated version of the first source asset which contains updated first scene information;
generating a first updated canonical representation having a plurality of sub-assets corresponding to the updated version of the first source asset;
comparing the first canonical representation and the first updated canonical representation by: computing a first set of hash values based upon the plurality of sub-assets for the first canonical representation and a second set of hash values based upon the plurality of sub-assets for the first updated canonical representation, and comparing ones of the first set of hash values and respective ones of the second set of hash values; and
detecting, based upon the comparing, that the first source asset has been updated.

44. The computer program product of claim 43, the method further comprising: receiving a second source asset containing second scene information defining at least another portion of the scene; receiving an updated version of the second source asset containing updated second scene information; comparing representations of the second source asset and the updated version of the second source asset; and detecting, based upon the comparing, that the second source asset has been updated.

45. The method of claim 44, wherein the comparing includes comparing a second canonical representation corresponding to the second source asset and an updated second canonical representation corresponding to the updated second source asset.

46. The method of claim 43, the method further comprising loading, in response to the detecting, a selected portion of the updated version of the first source asset into the editing environment.

47. The method of claim 43, wherein the detecting further includes determining that a first sub-asset and a second sub-asset of the first source asset have been updated, and, the method further comprising: selectively loading an updated version of the first sub-asset and an updated version of the second sub-asset into the editing environment.

48. The method of claim 43, wherein the plurality of sub-assets are organized in accordance with a hierarchical relationship, and wherein the comparing includes comparing the ones of the first set of hash values and the respective ones of the second set of hash values in an order determined by the hierarchical relationship.

49. The method of claim 43, wherein the detecting includes identifying differences between ones of the first set of hash values and corresponding ones of the second set of hash values.

50. The method of claim 43, wherein ones of the first set of hash values are arranged in a hierarchical relationship and are associated with corresponding hierarchical levels of the plurality of sub-assets.

51. The method of claim 50, wherein the comparing includes comparing ones of the second set of hash values with corresponding ones of the first set of hash values to identify differences between the first set of hash values and the second set of hash values.

52. The method of claim 49, wherein one or more of the corresponding plurality of sub-assets are loaded into the editing environment responsive to said differences.

53. The method of claim 43, wherein the first canonical representation includes a hierarchical tree representation of a plurality of sub-assets of the first source asset, and wherein the first updated canonical representation includes an updated hierarchical tree representation of a corresponding plurality of sub-assets of the updated version of the first source asset.

54. The method of claim 49, the method further comprising: loading, into the editing environment, selected portions of the updated version of the first source asset based upon the differences.

55. The method of claim 43, wherein one of the characteristics of the graphics engine is granularity.

56. The method of claim 43, wherein one of the characteristics of the graphics engine is memory capacity.

\* \* \* \* \*